United States Patent
Kim et al.

(10) Patent No.: US 10,931,209 B2
(45) Date of Patent: Feb. 23, 2021

(54) ENERGY HARVESTER USING TRIBOELECTRICITY AND APPARATUS INCLUDING THE SAME

(71) Applicant: Samsung Electronics Co., Ltd., Suwon-si (KR)

(72) Inventors: Jae-Young Kim, Suwon-si (KR); Kyungeun Byun, Seongnam-si (KR); Hyeonjin Shin, Suwon-si (KR); Alum Jung, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 571 days.

(21) Appl. No.: 15/378,577

(22) Filed: Dec. 14, 2016

(65) Prior Publication Data
US 2018/0006582 A1    Jan. 4, 2018

(30) Foreign Application Priority Data

Jun. 29, 2016 (KR) .................. 10-2016-0081536

(51) Int. Cl.
*H02N 1/04* (2006.01)
(52) U.S. Cl.
CPC .................................... *H02N 1/04* (2013.01)
(58) Field of Classification Search
CPC ....................................................... H02N 1/04
See application file for complete search history.

(56) References Cited

U.S. PATENT DOCUMENTS

| | | | |
|---|---|---|---|
| 9,876,443 B2 * | 1/2018 | Bae | H02N 1/04 |
| 2014/0338458 A1 * | 11/2014 | Wang | G01L 1/005 |
| | | | 73/658 |
| 2015/0001993 A1 | 1/2015 | Park et al. | |
| 2016/0105538 A1 | 4/2016 | Olah et al. | |
| 2016/0276957 A1 * | 9/2016 | Sugawara | H02N 2/186 |
| 2016/0373028 A1 | 12/2016 | He et al. | |

FOREIGN PATENT DOCUMENTS

| | | |
|---|---|---|
| CN | 103760138 A | 5/2014 |
| CN | 104467514 A | 3/2015 |
| CN | 104660095 A | 5/2015 |

(Continued)

OTHER PUBLICATIONS

Extended European Search Report dated Oct. 5, 2017 for corresponding European Application No. 16206513.0.

(Continued)

*Primary Examiner* — Jue Zhang
(74) *Attorney, Agent, or Firm* — Harness, Dickey & Pierce, P.L.C.

(57) ABSTRACT

Example embodiments relate to an energy harvester using triboelectricity, and to an apparatus including the energy harvester. The energy harvester may include a first structure having a first triboelectric material, a second structure having a second triboelectric material, and a closed structure isolating friction surfaces of the first and second triboelectric materials from external environment. The energy harvester may further include a filling material in the closed structure. The filling material may have an electric charge. The filling material may have a viscosity. At least a portion of the closed structure may include an elastic material.

23 Claims, 20 Drawing Sheets

(56) References Cited

FOREIGN PATENT DOCUMENTS

| CN | 104811084 A | 7/2015 |
|---|---|---|
| CN | 104980058 A | 10/2015 |
| CN | 104980059 A | 10/2015 |
| CN | 104980060 A | 10/2015 |
| WO | WO-13151590 A2 | 10/2013 |
| WO | WO-2015/035788 A1 | 3/2015 |

OTHER PUBLICATIONS

Military Handbook, "Electrostatic Discharge Control Handbook for Protection of Electrical and Electronic Parts, Assemblies and Equipment (Excluding Electrically Initiated Explosive Devices)," 1980, pp. 1-69, http://www.everyspec.com.

Nguyen, Vu, et al., "Effect of humidity and pressure on the triboelectric nanogenerator," Nano Energy, vol. 2, 2013, pp. 604-608.

McCarty, Logan S., et al., "Electrostatic Charging Due to Separation of Ions at Interfaces: Contact Electrification of Ionic Electrets," Angewandte Chemie, vol. 47, 2008, pp. 2188-2207.

Wei, Xiao Yan, et al., "Surface-charge engineering for high-performance triboelctric nanogenerator based on identical electrification materials," Nano Energy, vol. 10, 2014, pp. 83-89.

Wang, Sihong, et al., "Maximum Surface Charge Density for Triboelectric Nanogenerators Achieved by Ionized-Air Injection: Methodology and Theoretical Understanding," Advanced Materials, vol. 26, 2014, pp. 6720-6728.

Tang, Wei, et al., "Liquid-Metal Electrode for High-Performance Triboelectric Nanogenerator at an Instantaneous Energy Conversion Efficiency of 70.6%," Advanced Functional Materials, vol. 25, 2015, pp. 3718-37-25.

Yang, Ya, et al., "Triboelectric Naonogenerator for Harvesting Wind Energy and as Self-Powered Wind Vector Sensor System," AMerican Chemical Society NANO, vol. 7, No. 10, 2013, pp. 9461-9468.

Chinese Office Action dated Nov. 28, 2019 issued in corresponding Chinese Application No. 201710206465.6 (with English translation).

* cited by examiner

< COMPARATIVE EXAMPLE >

ENERGY HARVESTER USING TRIBOELECTRICITY AND APPARATUS INCLUDING THE SAME

CROSS-REFERENCE TO RELATED APPLICATION

This application claims the benefit of priority from Korean Patent Application No. 10-2016-0081536, filed on Jun. 29, 2016, in the Korean Intellectual Property Office, the disclosure of which is incorporated herein in its entirety by reference.

BACKGROUND

1. Field

Example embodiments relate to energy harvesters using triboelectricity, and apparatuses including the energy harvesters.

2. Description of the Related Art

Recently, the use of various electronic apparatuses has rapidly increased. Particularly, the use of apparatuses such as mobile devices, wearable devices, or small home appliances has markedly increased. However, high-capacity batteries or frequent recharge of batteries is typically required to supply power to such electronic apparatuses. Thus, the development of power sources having a high degree of energy efficiency and applicability to various electronic apparatuses has been needed.

SUMMARY

Example embodiments relate to energy harvesters having high efficiency.

Example embodiments relate to energy harvesters configured to reduce or suppress deterioration of the properties thereof caused by external environment such as, for example, environmental agents.

Example embodiments relate to energy harvesters having improved efficiency when electrified by friction.

Example embodiments relate to apparatuses such as, for example, electronic apparatuses, including the energy harvesters.

Additional example embodiments will be set forth in part in the description which follows and, in part, will be apparent from the description, or may be learned by practice of the example embodiments.

According to an example embodiment, an energy harvester includes a first structure including a first triboelectric material, a second structure including a second triboelectric material generating electricity by friction with the first triboelectric material, a closed structure isolating friction surfaces of the first and second triboelectric materials from environmental agents, and a filling material filled in the closed structure in contact with the first and second triboelectric materials and having a plurality of electric charges, the filling material increasing electrification efficiency of the first and second triboelectric materials.

In some example embodiments, the first and second structures may face each other, and the first and second triboelectric materials may be repeatedly brought into contact with, and separated from, each other.

In some example embodiments, the first structure may include a first material layer and a first electrode contacting the first material layer, and the first material layer may the first triboelectric material. The second structure may include a second material layer including the second triboelectric material, and may be configured to be, or operate as, an electrode. In this case, the filling material and the first electrode may not be in contact with each other but may be physically separate from each other. The closed structure may surround a lateral side of the first material layer and a lateral side of the second material layer, and at least a portion of the first electrode may be not covered with the closed structure.

In some example embodiments, the first structure may include a first material layer and a first electrode contacting the first material layer, and the first material layer may include the first triboelectric material. The second structure may include a second material layer and a second electrode contacting the second material layer, and the second material layer may include the second triboelectric material. In this case, the filling material may not be in contact with the first and second electrodes but may be physically separate from the first and second electrodes. The closed structure may surround a lateral side of the first material layer and a lateral side of the second material layer, and at least a portion of the first electrode and at least a portion of the second electrode may not be covered with the closed structure.

At least a portion of the closed structure may include an elastic material.

The filling material may include an ionic liquid or ion-gel.

The filling material may have a positive electric charge and a negative electric charge.

The filling material may include a fluid having a viscosity of about 4 mPa·s or greater at a temperature of about 25° C.

One of the first and second structures may include at least one guide pin, the other of the first and second structures may include at least one guide hole to receive the guide pin, and a movement direction in which the second structure is moved relative to the first structure may be controlled by the guide pin and the guide hole.

The energy harvester may further include at least one spring element between the first and second structures.

According to another example embodiment, an electronic apparatus includes the energy harvester and a circuit portion connected to the energy harvester.

The electronic apparatus may be or include, for example, a mobile device or a wearable device.

According to another example embodiment, an energy harvester includes a first structure including a first triboelectric material, a second structure including a second triboelectric material generating electricity by friction with the first triboelectric material, and an intermediate material placed between the first and second structures and having an electric charge, wherein when a gap between the first and second structures is decreased, the intermediate material is moved outward from the gap between the first and second structures, and when the gap between the first and second structures is increased, the intermediate material fills the gap between the first and second structures.

The intermediate material may include an ionic liquid or ion-gel.

The intermediate material may have a positive electric charge and a negative electric charge.

The intermediate material may include a fluid having a viscosity of about 4 mPa·s or greater at a temperature of about 25° C.

The energy harvester may further include a closed structure surrounding at least a portion of the energy harvester, wherein the intermediate material may be in the closed structure, and at least a portion of the closed structure may include an elastic material.

The first structure may include a first material layer and a first electrode contacting the first material layer, and the first material layer may include the first triboelectric material, and the second structure may include a second material layer including the second triboelectric material and may be configured to be, or operate as, an electrode.

The first structure may include a first material layer and a first electrode contacting the first material layer, and the first material layer may include the first triboelectric material. The second structure may include a second material layer and a second electrode contacting the second material layer, and the second material layer may include the second triboelectric material.

According to another example embodiment, an electronic apparatus includes the energy harvester, and a circuit portion connected to the energy harvester.

BRIEF DESCRIPTION OF THE DRAWINGS

These and/or other example embodiments will become apparent and more readily appreciated from the following description of the example embodiments, taken in conjunction with the accompanying drawings in which.

DETAILED DESCRIPTION

Figure 1:
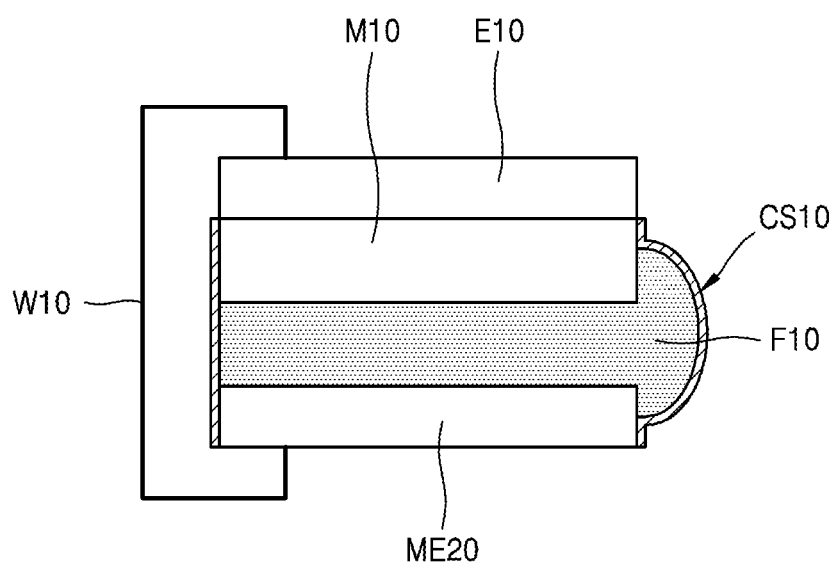
FIG. 1 is a cross-sectional view illustrating an energy harvester according to an example embodiment.

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures. As used herein, the term "and/or" includes any and all combinations of one or more of the associated listed. Expressions such as "at least one of," when preceding a list of elements, modify the entire list of elements and do not modify the individual elements of the list.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

Hereinafter, energy harvesters using triboelectricity and apparatuses such as, for example, electronic apparatuses, including the energy harvesters will be described according to example embodiments with reference to the accompanying drawings. In the drawings, the widths and thicknesses of layers or regions may be exaggerated for clarity or ease of description. In the following description, like reference numerals refer to like elements throughout.

FIG. 1 is a cross-sectional view illustrating an energy harvester according to an example embodiment.

Referring to FIG. 1, a first material layer M10 may include a first triboelectric material, and a first electrode E10 may be in contact/connection with the first material layer M10. The first material layer M10 and the first electrode E10 may form a first structure. A second material layer ME20 may include a second triboelectric material capable of generating electricity by friction with the first triboelectric material. In the example embodiment, the second material layer ME20 including the second triboelectric material may be configured to be or operate as an electrode. The second material layer ME20 may be referred to as a second structure opposite the first structure (including the first material layer M10 and the first electrode E10).

The first triboelectric material of the first material layer M10, and the second triboelectric material of the second material layer ME20 may be selected from various triboelectric materials used in the related art. One of the first material layer M10 and the second material layer ME20 may include a material that is easy to electrify negatively (−), and the other may include a material that is easy to electrify positively (+). For example, the first material layer M10 may include a material that is easy to electrify negatively (−) such as silicone rubber, Teflon, polydimethylsiloxane (PDMS), Kapton, polypropylene (PP), polyethylene (PE), and polyvinyl chloride (PVC). Alternatively, the first material layer M10 may include a material such as ferroelectrics or electrets. Examples of the electrets may include fluoropolymer, polyvinylfluoride (PVF), polyvinylidene fluoride (PVDF), polychlorotrifluoroethylene (PCTFE), perfluoroalkoxy alkane (PFA), fluorinated ethylene propylene (FEP), ethylene tetrafluoroethylene (ETFE), polyethylene terephthalate (PET), and quartz. The second material layer ME20 may include a material that is easy to electrify positively (+) such as polyformaldehyde, ethylcellulose, polyamide, wool, silk, cotton, steel, wood, aluminum (Al), nickel (Ni), copper (Cu), silver (Ag), and polyvinyl alcohol (PVA), for example. In the example embodiment, the second material layer ME20 may be configured to be, or operate as, an electrode, and thus the second material layer ME20 may include a conductive material (for example, a metal or metallic material). For example, the second material layer ME20 may include aluminum foil or a silver fabric. The above-mentioned materials are merely examples that may be included in the first and second material layers M10 and ME20. That is, other various materials may be included in the first and second material layers M10 and ME20. Alternatively, the first material layer M10 may include a material that is easy to electrify positively (+), and the second material layer ME20 may include a material that is easy to electrify negatively (−).

The first electrode E10 and the second material layer ME20 may be electrically connected to each other. For example, the first electrode E10 and the second material layer ME20 may be connected to each other via a wire W10. Electricity generated by friction/contact between the first material layer M10 and the second material layer ME20 may flow through the wire W10. A load or circuit (not shown) may be connected to the wire W10.

A closed structure CS10 may be provided to isolate at least friction surfaces of the first and second triboelectric materials from external environment such as, for example, environmental agents. The closed structure CS10 may isolate a friction surface of the first material layer M10 and a friction surface of the second material layer ME20 from external environment such as, for example, environmental agents. The closed structure CS10 may surround a lateral side (i.e., side surface) of the first material layer M10 and a lateral side (i.e., side surface) of the second material layer ME20. The closed structure CS10 may be attached to the lateral side of the first material layer M10 and the lateral side of the second material layer ME20. At least a portion of the closed structure CS10 may include an elastic material. For example, the elastic material may include an elastomer such as rubber.

A filling material (filler) F10 may be filled in the closed structure CS10. The filling material F10 may be in contact with the first and second triboelectric materials. In other words, the filling material F10 may be in contact with the first material layer M10 and the second material layer ME20. The filling material F10 may include a material having a plurality of electric charges. The filling material F10 may have a positive electric charge and a negative electric charge. The filling material F10 may include cations and anions. For example, the filling material F10 may include an ionic liquid or ion-gel. The ion-gel may include a mixture of an ionic liquid and a polymer binder. In addition, the filling material F10 may include a fluid having a viscosity of about 4 mPa·s or greater at room temperature (about 20° C.-25° C.). For example, the viscosity of the filling material F10 may be adjusted by varying the type of the ionic liquid or the amount of a polymer included in the filling material F10. Owing to the filling material F10, the efficiency of electrification of the first and second triboelectric materials may be increased. This will be described later.

If the filling material F10 includes an ionic liquid, the filling material F10 may include at least one cation selected from EMIM, DMIM, PMIM, BMPyr, BMPy, AMIM, APy, N-methyl-N-alkylpyrrolidinium, and ammonium ions. In addition, the filling material F10 may include at least one anion selected from SCN, DCA, BF4, OTF, NTF$_2$, PF$_6$, [(CF$_3$SO$_2$)$_2$N], CF$_3$SO$_3$, ammonium salts, choline, tosylate, formate, alkylsulfate, alkylphosphate, and glycolate. Chemical names of EMIM, DMIM, PMIM, BMPyr, BMPy, AMIM, APy, SCN, DCA, BF4, OTF, NTF$_2$, PF$_6$, [(CF$_3$SO$_2$)$_2$N], and CF$_3$SO$_3$ may be as follows:

EMIM: 1-Ethyl-3-methylimidazolium
DMIM: 1-Methyl-3-methylimidazolium
PMIM: 1-Propyl-3-methylimidazolium
BMPyr: 1-Butyl-1-methylpyrrolidinium
BMPy: 1-Butyl-3-methylpyridinium
AMIM: 1-alkyl-3-methylimidazolium
APy: 1-alkylpyridinium
SCN: thiocyanate
DCA: dicyanamide
BF4: tetrafluoroborate
OTF: trifluoromethanesulfonate
NTf2: bi(trifluoromethanesulfonyl)imide
PF6: hexafluorophosphate
[(CF$_3$SO$_2$)$_2$N]: bis-trifluorsulfonimide (=bistriflimide)
CF$_3$SO$_3$: triflate However, the kinds of cations and anions that may be included in the filling material F10 are not limited to the above-mentioned cations and anions. That is, the kinds of cations and anions that may be included in the filling material F10 may be varied.

The filling material F10 may not be in contact with the first electrode E10. That is, the filling material F10 may be physically separate from the first electrode E10. The filling material F10 and the first electrode E10 may be separated from each other by the closed structure CS10. To this end, the size and formation range of the closed structure CS10 may be determined to reduce or prevent contact between the filling material F10 and the first electrode E10. However, if the filling material F10 has a low degree of electric conductivity, the closed structure CS10 may be designed to allow contact between the filling material F10 and the first electrode E10. The size and shape of the closed structure CS10 and the formation range of the filling material F10 determined by the closed structure CS10 illustrated in FIG. 1 are examples and may be variously changed. A portion of the lateral side of the first material layer M10 and/or a portion of the lateral side of the second material layer ME20 may not be surrounded by the closed structure CS10 but may be exposed. For example, since an upper-end portion of the lateral side of the first material layer M10 may not considerably contribute to electrification, the upper-end portion of the lateral side of the first material layer M10 may not be surrounded by the closed structure CS10 and may be exposed. In addition, at least a portion of a lateral side of the first electrode E10 may be covered with the closed structure CS10.

FIGS. 2A-2D are cross-sectional views illustrating the operational mechanism/principle of the energy harvester illustrated in FIG. 1.

Referring to FIGS. 2A-2D, triboelectricity may be generated between the first material layer M10 and the second material layer ME20 while the first material layer M10 and the second material layer ME20 are repeatedly brought into contact with each other and separated from each other.

Figure 2A:
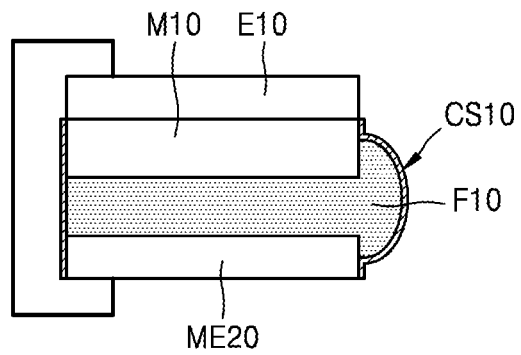
FIGS. 2A-2D are cross-sectional views illustrating the operational mechanism/principle of the energy harvester illustrated in FIG. 1.

As shown in FIG. 2A, the first material layer M10 and the second material layer ME20 are separate from each other. FIG. 2A may correspond to the structure illustrated in FIG. 1.

Figure 2B:
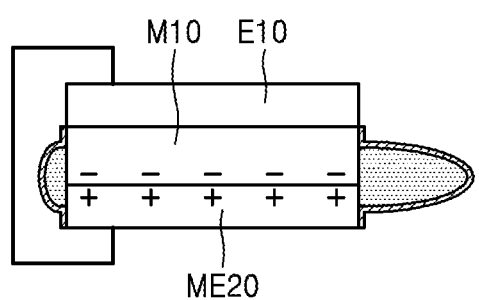

When the first material layer M10 and the second material layer ME20 are brought into contact with each other, as illustrated in FIG. 2B, an electric charge may be generated on friction surfaces of the first material layer M10 and the second material layer ME20. For example, a negative (−) electric charge may be induced in the first material layer M10, and a positive (+) electric charge may be induced in the second material layer ME20. The reverse thereof is also possible. As the first and second material layers M10 and ME20 are brought into contact with each other, electrification may occur by friction between the first and second material layers M10 and ME20. As a gap between the first and second material layers M10 and ME20 is decreased, the filling material F10 may be moved outward from the gap between the first and second material layers M10 and ME20. At this time, since at least a portion of the closed structure CS10 includes an elastic material, the closed structure CS10 may stretch to receive the filling material F10.

Figure 2C:
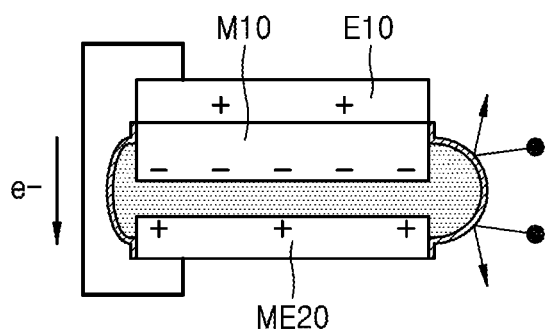

At FIG. 2C, when the gap between the first and second material layers M10 and ME20 is increased to a certain degree, current may flow between the first electrode E10 and the second material layer ME20. For example, electrons (e−) may move from the first electrode E10 to the second material layer ME20. As electrons (e−) move from the first electrode E10 to the second material layer ME20, holes may be formed in the first electrode E10 or a corresponding effect may occur, and electrical disequilibrium between the first electrode E10 and the first material layer M10 may be reduced. In addition, when the first and second material layers M10 and ME20 are separated from each other, the restoring force (resilience) of the elastic material (elastic body) of the closed structure CS10 may somewhat contribute to the separation. In other words, the restoring force (resilience) of the elastic material portion of the closed structure CS10 presenting when the closed structure CS10 is stretched may have some role in separation of the first and second material layers M10 and ME20. In addition, since the closed structure CS10 isolates the first and second material layers M10 and ME20 from external environment (environmental agents), degradation caused by external environment (environmental agents) may be prevented or minimized. For example, due to moisture (humidity) of air, an electric charge between the first and second material layers M10 and ME20 may disappear into the air. However, the closed structure CS10 may reduce or prevent such discharge.

Figure 2D:
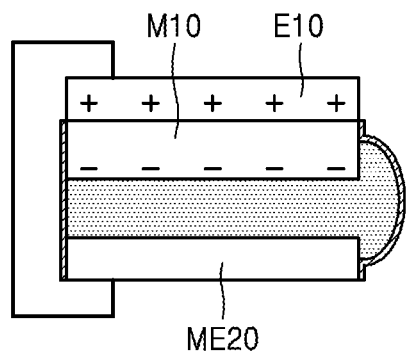

In FIG. 2D, the first material layer M10 and the first electrode E10 are in electric equilibrium. Although not shown, when the first and second material layers M10 and ME20 are brought into contact with each other again after the configuration illustrated in FIG. 2D, current may flow between the first electrode E10 and the second material layer ME20 as illustrated in FIG. 2B. In this manner, triboelectricity may be generated between the first material layer M10 and the second material layer ME20 while the first material layer M10 and the second material layer ME20 are repeatedly brought into contact with each other and separated from each other. The mechanism described with reference to FIGS. 2A-2D is an example. That is, other mechanisms or principles may be used.

Figure 3:
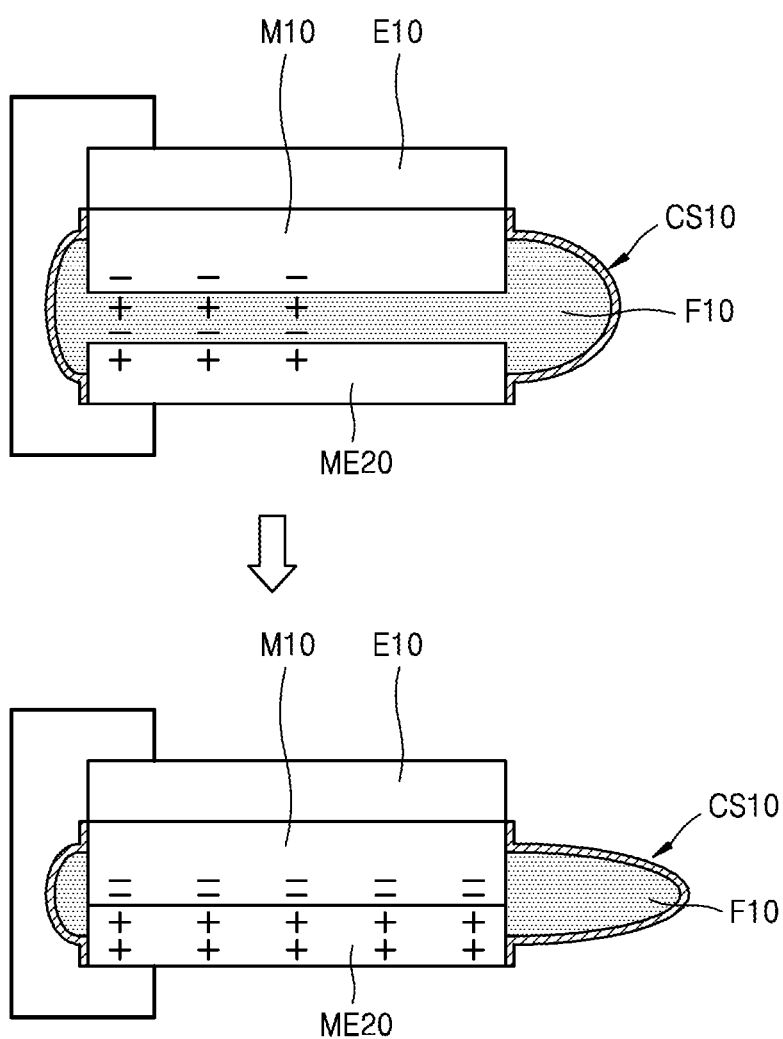
FIG. 3 is a cross-sectional view illustrating a principle of improving efficiency using a filling material (filler) in the energy harvester illustrated in FIG. 1.

FIG. 3 is a cross-sectional view illustrating a principle of improving efficiency using the filling material F10 in the energy harvester illustrated in FIG. 1.

Referring to FIG. 3, when the gap between the first and second material layers M10 and ME20 is decreased, the efficiency of triboelectricity generation may be improved owing to friction between the filling material F10 and the first and second material layers M10 and ME20. If the filling material F10 is a fluid having a viscosity, for example, about 4 mPa·s or greater at room temperature, additional friction caused by the filling material F10 may increase. In addition, if the filling material F10 has a positive (+) electric charge and a negative (−) electric charge, the inducement of a negative (−) electric charge in one of the first and second material layers M10 and ME20, for example, the first material layer M10, may be facilitated by the positive (+) electric charge of the filling material F10, and the inducement of a positive (+) electric charge in the other of the first and second material layers M10 and ME20, for example, the second material layer ME20, may be facilitated by the negative (−) electric charge of the filling material F10. As a result, the first and second material layers M10 and ME20 may be more efficiently electrified. Therefore, according to the example embodiment, an energy harvester having a high degree of efficiency may be provided.

The filling material F10 may be referred to as an intermediate material F10 between the first and second material layers M10 and ME20, and if the intermediate material F10 has an electric charge, the electrification efficiency of the energy harvester may be increased owing to the intermediate material F10. When the gap between the first and second material layers M10 and ME20 is decreased, the intermediate material F10 may move outward from the gap between the first and second material layers M10 and ME20, and when the gap between the first and second material layers M10 and ME20 is increased, the intermediate material F10 may fill the gap. For example, the intermediate material F10 may include an ionic liquid or ion-gel. The intermediate material F10 may have a positive (+) electric charge and a negative (−) electric charge. The intermediate material F10 may include a fluid having a viscosity of about 4 mPa·s or greater at room temperature (about 20° C.-25° C.). The intermediate material F10 may be contained in a closed structure (for example, the closed structure CS10 shown in FIG. 3).

Figure 4:
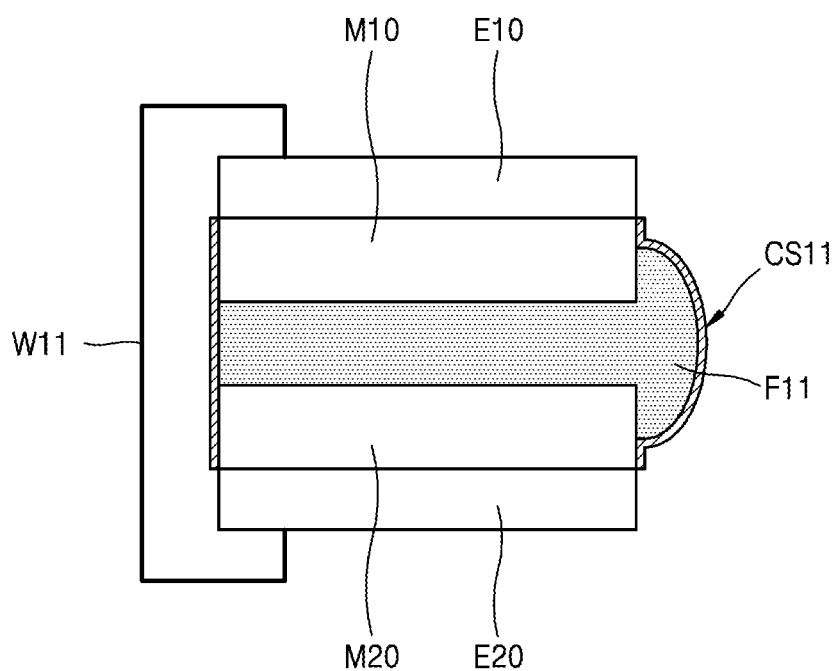
FIG. 4 is a cross-sectional view illustrating an energy harvester according to another example embodiment.

FIG. 4 is a cross-sectional view illustrating an energy harvester according to another example embodiment.

Referring to FIG. 4, a first material layer M10 may include a first triboelectric material, and a first electrode E10 may be in contact/connection with the first material layer M10. The first material layer M10 and the first electrode E10 may be identical or similar to those described with reference to FIG. 1. The first material layer M10 and the first electrode E10 may form a first structure. A second material layer M20 may include a second triboelectric material, and a second electrode E20 may be in contact/connection with the second material layer M20. The second triboelectric material may generate electricity by friction with the first triboelectric material. The second material layer M20 and the second electrode E20 may form a second structure. One of the first and second material layers M10 and M20 may be conductive, and the other may be non-conductive. Alternatively, both the first and second material layers M10 and M20 may be non-conductive. The first triboelectric material of the first material layer M10, and the second triboelectric material of the second material layer M20 may be selected from various triboelectric materials used in the related art.

The first and second material layers M10 and M20 may face each other. The first electrode E10 may be placed on an outer surface (here, an upper surface) of the first material layer M10, and the second electrode E20 may be placed on an outer surface (here, a lower surface) of the second material layer M20. For example, the first electrode E10 and the second electrode E20 may be electrically connected to each other via a wire W11. A load or circuit (not shown) may be connected to the wire W11.

A closed structure CS11 may surround a lateral side of the first material layer M10 and a lateral side of the second material layer M20. At least a portion of the closed structure CS11 may include an elastic material. The composition and properties of the closed structure CS11 may be identical or similar to those of the closed structure CS10 described with reference to FIG. 1. A filling material F11 may be provided in the closed structure CS11 and may be in contact with the first and second material layers M10 and M20. The composition and properties of the filling material F11 may be identical or similar to those of the filling material F10 described with reference to FIG. 1.

The filling material F11 may not be in contact with the first and second electrodes E10 and E20. That is, the filling material F11 may be physically separate from the first and second electrodes E10 and E20. Therefore, although the electrical conductivity of the filling material F11 is relatively high, the filling material F11 may not cause troubles such as a short circuit between the first and second electrodes E10 and E20. If the electrical conductivity of the filling material F11 is relatively low, the filling material F11 may be in contact with at least one of the first and second electrodes E10 and E20. The size and shape of the closed structure CS11 and the formation range of the filling material F11 determined by the closed structure CS11 are illustrated as an example, and various modifications or changes may be made thereto. This is similar to that explained when the closed structure CS10 and the filling material F10 are described with reference to FIG. 1.

FIGS. 5A-5D are cross-sectional views illustrating the operational mechanism/principle of the energy harvester illustrated in FIG. 4.

Figure 5A:
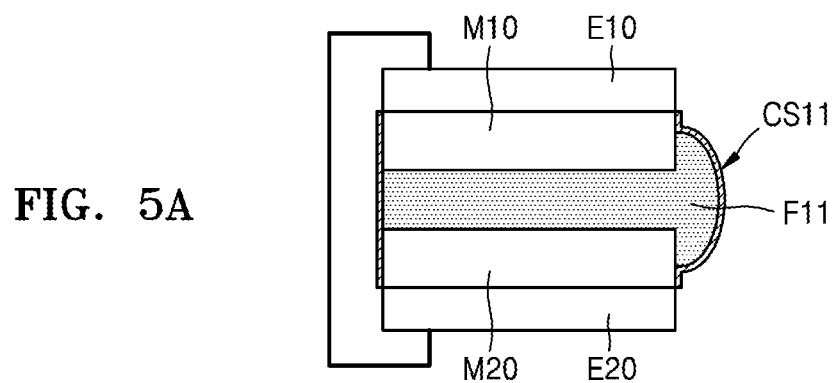
FIGS. 5A-5D are cross-sectional views illustrating the operational mechanism/principle of the energy harvester illustrated in FIG. 4.
Figure 5B:
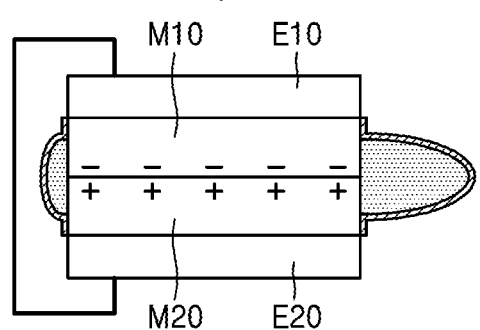
Figure 5C:
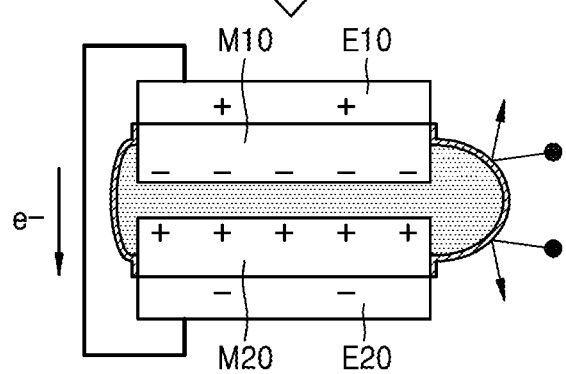
Figure 5D:
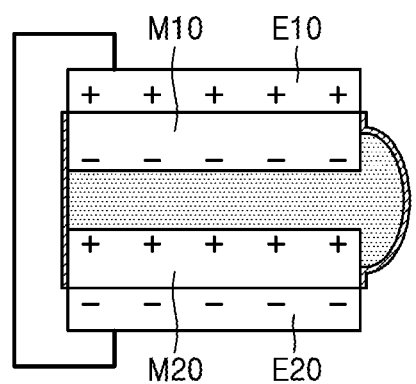

Referring to FIGS. 5A-B, as described with reference to FIGS. 2A-B, electric energy may be generated between the first and second material layers M10 and M20 while the first and second material layers M10 and M20 are repeatedly brought into contact with each other and separated from each other. FIGS. 5A-5D are similar to or the same as FIGS.

2A-D, and thus descriptions thereof will not be repeated here. Deterioration of the properties of the energy harvester caused by environmental agents (such as moisture) may be prevented or minimized owing to the closed structure CS11, and the efficiency of electrification may be increased owing to the filling material F11.

In other example embodiments, the filling materials F10 and F11 may be removed from the energy harvesters illustrated in FIGS. 1 and 4. That is, the insides of the closed structures CS10 and CS11 may be empty without the filling materials F10 and F11. Examples thereof are illustrated in FIGS. 6 and 7.

Figure 6:
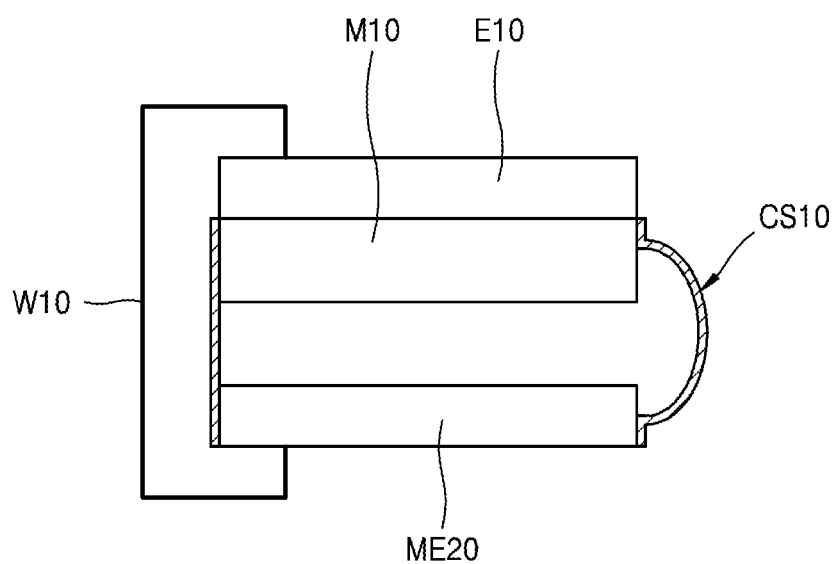
FIG. 6 is a cross-sectional view illustrating an energy harvester according to another example embodiment.
Figure 7:
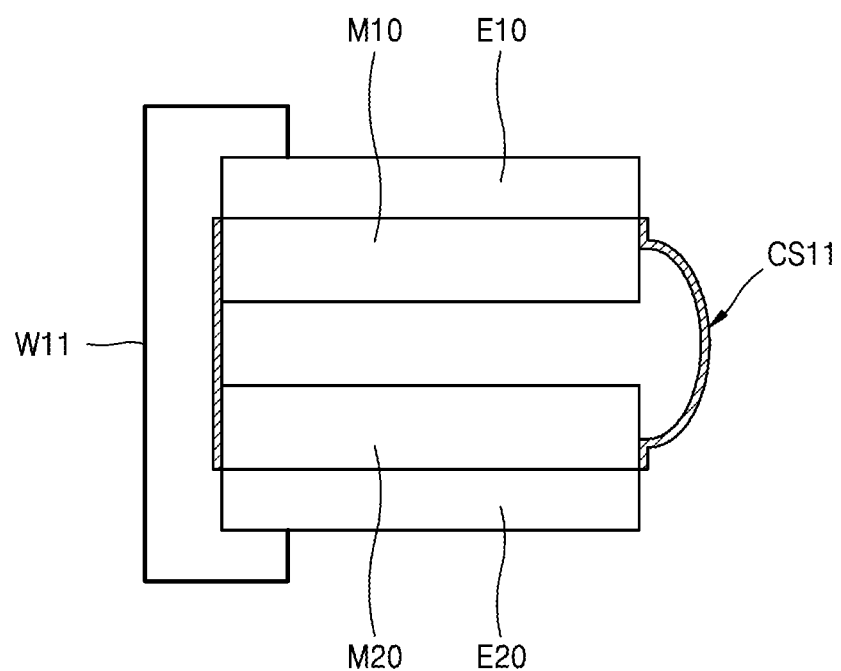
FIG. 7 is a cross-sectional view illustrating an energy harvester according to another example embodiment.

FIGS. 6 and 7 illustrate examples in which the filling materials F10 and F11 are not included in the energy harvesters of FIGS. 1 and 4. In the examples illustrated in FIGS. 6 and 7, the above-described effects may be obtained by the closed structures CS10 and CS11. For example, discharge of electricity caused by moisture/humidity of air may be reduced or prevented. In addition, if the closed structures CS10 and CS11 include an elastic material (elastic body), the restoring force (resilience) of the elastic material (elastic body) may make it easy to separate the first and second material layers M10 and M20 after the first and second material layers M10 and M20 are brought into contact with each other.

FIGS. 8A-8D are cross-sectional views illustrating an energy harvester and the operational mechanism of the energy harvester according to a comparative example.

Figure 8A:
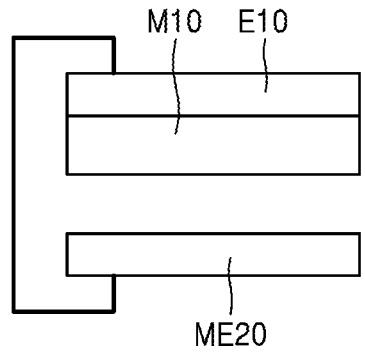
FIGS. 8A-8D are cross-sectional views illustrating an energy harvester and the operational mechanism of the energy harvester according to a comparative example.
Figure 8B:
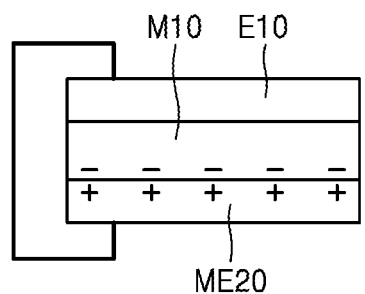
Figure 8C:
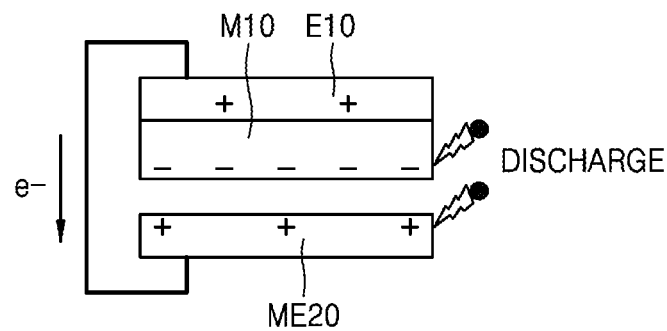
Figure 8D:
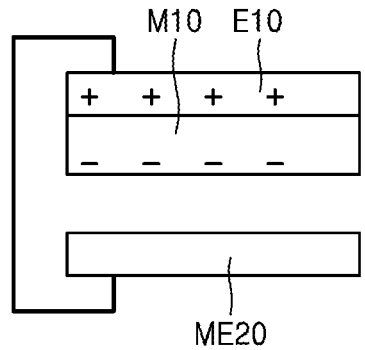

Referring to a FIG. 8A, the energy harvester according to the comparative example may have an open system. In other words, the energy harvester may not include a closed structure such as the closed structure CS10 or CS11 illustrated in FIGS. 1 and 4 but may have an exposed structure (open structure) in which first and second material layers M10 and ME20 are exposed to environmental agents. In this case, as illustrated in FIG. 8C, electric charges of the first and second material layers M10 and ME20 may contact moisture such as, for example, air humidity, and thus the first and second material layers M10 and ME20 may be electrically discharged. As the air humidity increases, static electricity decreases, and electrified materials loose a larger amount of electric charge. Thus, open systems such as the system illustrated in FIGS. 8A-8D may decrease the performance of energy harvesters.

In the above-described example embodiments, however, the first and second material layers M10 and M20/ME20 are isolated from environmental agents using the closed structures CS10 and CS11, and thus challenges created by environmental agents may be fundamentally, or substantially fundamentally, reduced or prevented. Therefore, the loss of electric charge caused by environmental agents may be reduced or prevented. In addition, since the filling materials F10 and F11 are contained in the closed structures CS10 and CS11, additional friction may occur between the filling materials F11 and the first and second material layers M10 and M20/ME20. Moreover, electric charges of the filling materials F10 and F11 may increase the electrification efficiency of the first and second material layers M10 and M20/ME20. Therefore, the efficiency of electricity generation may be markedly increased. For example, if the filling materials F10 and F11 are fluids having viscosity such as, for example, a viscosity of about 4 mPa·s or greater at room temperature of about 20° C.-25° C., friction effects between the filling materials F10 and F11 and the first and second material layers M10 and M20/ME20 may be increased.

Figure 9:
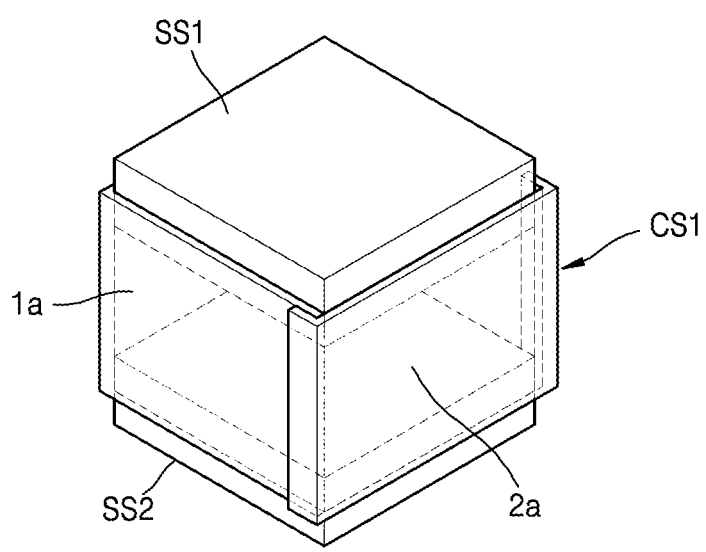
FIG. 9 is a perspective view illustrating a closed structure for an energy harvester according to an example embodiment.

FIG. 9 is a perspective view illustrating a closed structure for an energy harvester according to an example embodiment.

Referring to FIG. 9, a first structure SS1 including a first triboelectric material may face a second structure SS2 including a second triboelectric material. In this state, a closed structure CS1 may surround a space between the first structure SS1 and the second structure SS2. The closed structure CS1 may surround at least a portion of a lateral side of the first structure SS1 and at least a portion of a lateral side of the second structure SS2. If each of the first and second structures SS1 and SS2 has four lateral sides, three of the four lateral sides may be covered with a first material film 1a, and the other side may be covered with a second material film 2a. At least one, for example, the second material film 2a, of the first and second material films 1a and 2a may include an elastic material. In this case, the first material film 1a may include an inelastic material or an elastic material. The first material film 1a may be flexible. For example, the first material film 1a may include a polymer.

After surrounding three lateral sides of each, or at least one, of the first and second structures SS1 and SS2 with the first material film 1a, an opened side, that is, the other lateral side of each, or at least one, of the first and second structures SS1 and SS2 may be turned upward, and a filling material (not shown) may be filled inside the first and second structures SS1 and SS2. Thereafter, the opened side may be covered with the second material film 2a. At this time, both end portions of the second material film 2a may be attached to end portions of the first material film 1a. In addition, each, or at least one, of the first and second material films 1a and 2a may be attached to lateral sides of the first and second structures SS1 and SS2.

If a gap between the first and second structures SS1 and SS2 is reduced, the second material film 2a may become convex in a lateral direction. As a result, a portion of the closed structure CS1 may protrude in the lateral direction like the closed structure CS10 illustrated in FIG. 1.

In the example embodiment illustrated in FIG. 9, two kinds of materials, such as the first and second material films 1a and 2a, are used to form the closed structure CS1. In another example embodiment, however, a single kind of material, such as an elastic material, may be used to form a closed structure. An example thereof is illustrated in FIG. 10.

Figure 10:
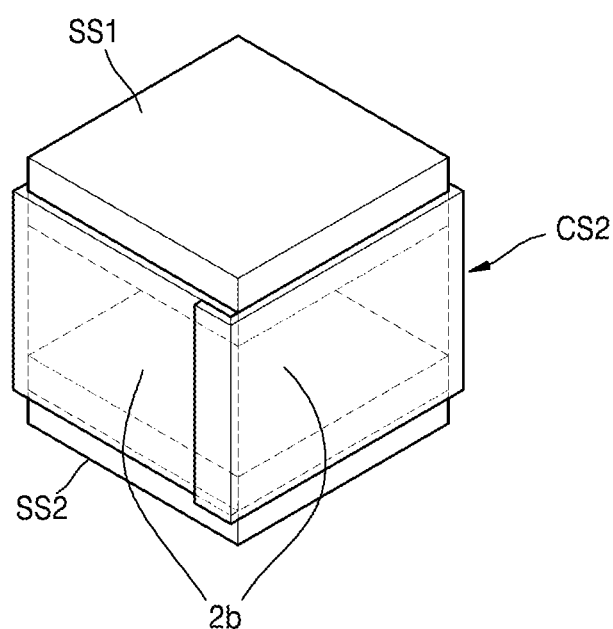
FIG. 10 is a perspective view illustrating a closed structure for an energy harvester according to another example embodiment.

FIG. 10 is a perspective view illustrating a closed structure for an energy harvester according to another example embodiment.

Referring to FIG. 10, a closed structure CS2 may be formed by surrounding lateral sides of a first structure SS1 and a second structure SS2 with a single kind of material film 2b. After surrounding three lateral sides of each, or at least one, of the first and second structures SS1 and SS2 with the material film 2b, an opened side, that is, the other lateral side, of each, or at least one, of the first and second structures SS1 and SS2 may be turned upward, and a filling material (not shown) may be filled inside the first and second structures SS1 and SS2. Thereafter, the opened side may be covered with the material film 2b. Both ends of the material film 2b may be bonded together. As described with reference to FIG. 9, if a gap between the first and second structures SS1 and SS2 is reduced, at least a portion of the material film 2b may become convex in a lateral direction.

FIGS. 9 and 10 illustrate specific methods of constructing the closed structures CS1 and CS2. However, the discussed methods are examples, and various modifications may be made thereto. For example, the sizes and materials of the closed structures CS1 and CS2, and attachment methods for the closed structures CS1 and CS2 may be variously varied or changed. In addition, a filling material may be filled in the closed structures CS1 and CS2 by a method selected from various methods. In addition, the first and second structures SS1 and SS2 may have a shape such as a circular or elliptical shape instead of having a rectangular shape.

Figure 11:
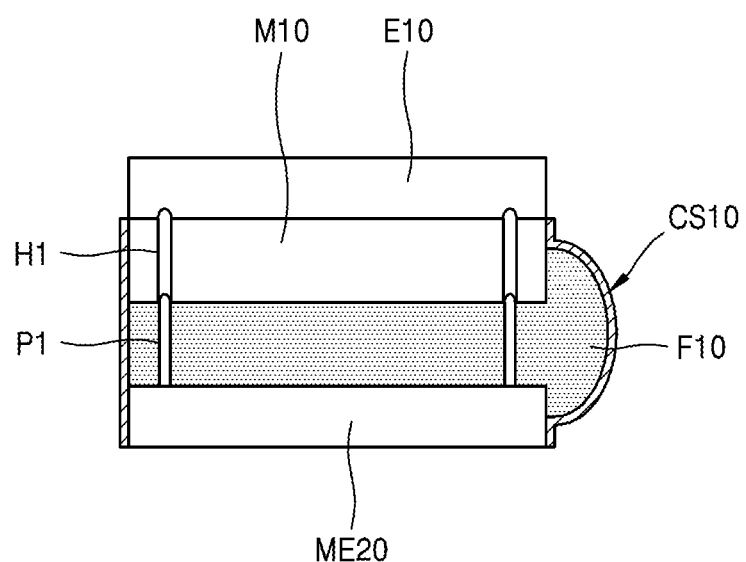
FIG. 11 is a cross-sectional view illustrating an energy harvester according to another example embodiment.

In the previous embodiments such as the example embodiments described with reference to FIGS. 9 and 10, one of the first and second structures SS1 and SS2 may include at least one guide pin, and the other one of the first and second structures SS1 and SS2 may include at least one guide hole to receive the guide pin. In this case, movement of the second structure SS2 relative to the first structure SS1 may be controlled by the guide pin and the guide hole. An example of this is illustrated in FIG. 11. FIG. 11 illustrates an example embodiment in which the energy harvester illustrated in FIG. 1 includes guide pins P1 and guide holes H1.

Referring to FIG. 11, the guide pins P1 may be provided on the second material layer ME20, and the guide holes H1 may be formed in the first material layer M10. If necessary, the guide holes H1 may extend into the first electrode E10. The guide pins P1 may be designed to be respectively inserted into the guide holes H1. A movement direction in which the second material layer ME20 is moved relative to the first material layer M10 or the first material layer M10 is moved relative to the second material layer ME20 may be controlled by the guide pins P1 and the guide holes H1. Therefore, the first and second material layers M10 and ME20 may easily be moved onto each other and away from each other. In the example embodiment, the guide holes H1 are formed in the first material layer M10, and the guide pins P1 are provided on the second material layer ME20. However, the positions of the guide holes H1 and the guide pins P1 may be changed with each other. In addition, a method other than the example method of using the guide holes H1 and the guide pins P1 may be used to control the movement direction.

In addition, although the guide holes H1 extend from the first material layer M10 into the first electrode E10 as illustrated in FIG. 11, contact between the filling material F10 and the first electrode E10 through the guide holes H1 may be reduced or prevented if necessary. For example, internal surfaces of the guide holes H1 may be coated with insulating films to reduce or prevent contact between the first electrode E10 and the filling material F10. If the depth of the guide holes H1 is smaller than the thickness of the first material layer M10, the first electrode E10 may not be exposed through the guide holes H1, and the first electrode E10 and the filling material F10 may not be in contact with each other.

In FIG. 11, the guide pins P1 and the guide holes H1 are provided inside the closed structure CS10. However, the guide pins P1 and the guide holes H1 may be provided outside the closed structure CS10. For example, a first substrate may be placed on the first electrode E10, and a second substrate may be provided on the second material layer ME20. In this case, the first and second substrates may be wider than the closed structure CS10, and guide pins and guide holes may be provided on or in the first and second substrates. The structure illustrated in FIG. 11 may be variously modified.

As described above, in the example embodiment, the first structure including the first triboelectric material may further include a first substrate, and the second structure including the second triboelectric material may further include a second substrate. That is, in the energy harvester illustrated in FIG. 1, the first electrode E10 and the first material layer M10 may be provided on the first substrate, the second material layer ME20 may be provided on the second substrate, and the first and second substrates may be oriented such that the first and second material layers M10 and ME20 may face each other. Furthermore, in the energy harvester illustrated in FIG. 4, the first electrode E10 and the first material layer M10 may be provided on a first substrate, the second electrode E20 and the second material layer M20 may be provided on a second substrate, and the first and second substrates may be oriented such that the first and second material layers M10 and M20 may face each other. An example in which first and second substrates are used is illustrated in FIG. 12.

Figure 12:
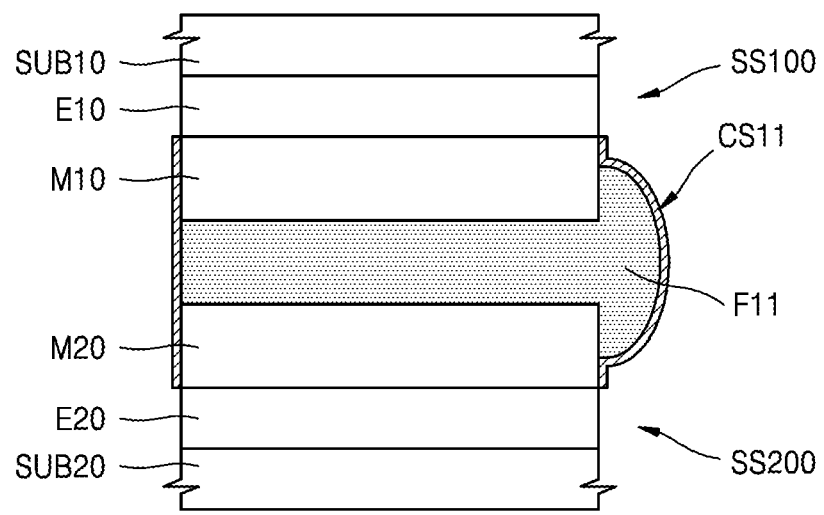
FIG. 12 is a cross-sectional view illustrating an energy harvester according to another example embodiment.

FIG. 12 is a cross-sectional view illustrating an energy harvester according to another example embodiment.

Referring to FIG. 12, a first structure SS100 may include a first substrate SUB10, and a first electrode E10 and a first material layer M10 that are placed, for example sequentially placed, on a surface of the first substrate SUB10. A second structure SS200 may include a second substrate SUB20, and a second electrode E20 and a second material layer M20 that are placed, for example sequentially placed, on a surface of the second substrate SUB20. For example, at least one of the first and second substrates SUB10 and SUB20 may include PET or an acrylic compound. However, materials of the first and second substrates SUB10 and SUB20 are not limited thereto but may be selected from various materials. The first and second structures SS100 and SS200 may be arranged such that the first and second material layers M10 and M20 may face each other. A closed structure CS11 may surround lateral sides of the first and second material layers M10 and M20, and a filling material F11 may be filled in the closed structure CS11. The first and second electrodes E10 and E20 may be electrically connected to each other via a wire structure (not shown). Owing to the first and second substrates SUB10 and SUB20, each, or at least one, of the first and second structures SS100 and SS200 may be enhanced in strength. In other words, the strength of the energy harvester may be enhanced. In some cases, one of the first and second substrates SUB10 and SUB20 may not be used.

In the energy harvester illustrated in FIG. 12, the first substrate SUB10 may have a size or width that is greater than the size or width of the first electrode E10 and of the first material layer M10. In addition, the second substrate SUB20 may have a size or width that is greater than the size of width of the second electrode E20 and of the second material layer M20. An example of the above is illustrated in FIG. 13.

Figure 13:
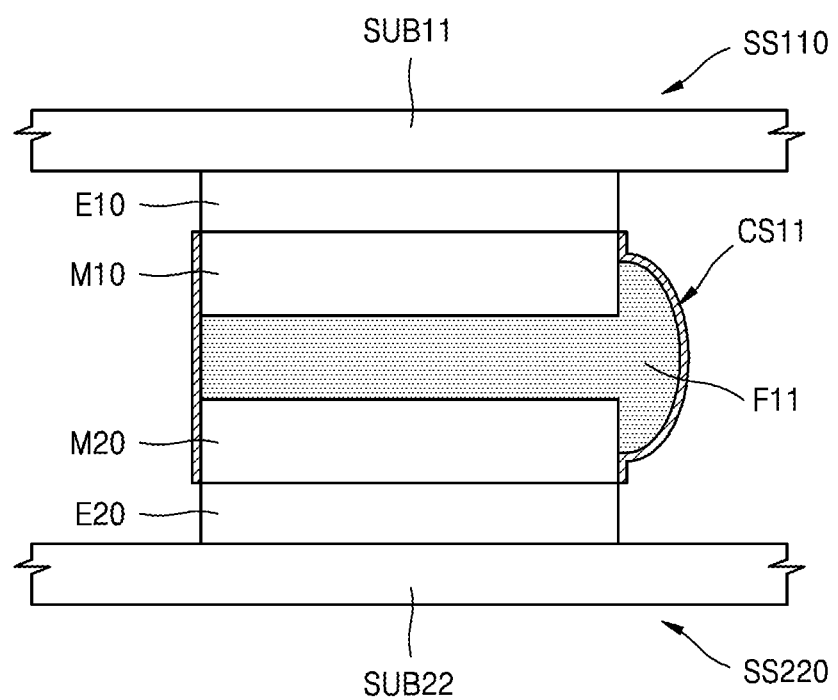
FIG. 13 is a cross-sectional view illustrating an energy harvester according to another example embodiment.

Referring to FIG. 13, a first substrate SUB11 may have a size or width that is greater than the size or width of a first electrode E10 and of a first material layer M10. A second substrate SUB22 may have a size or width that is greater than the size or width of a second electrode E20 and of a second material layer M20. The first electrode E10 and the first material layer M10 may easily be placed on a surface of the first substrate SUB11 because the first electrode E10 and the first material layer M10 are smaller than the first substrate SUB11. In addition, the second electrode E20 and the second material layer M20, which are smaller than the second substrate SUB22, may easily be placed on the second substrate SUB22. In addition, since the first substrate SUB11 has a relatively large size, a first structure SS110 including the first substrate SUB11 may easily be similarly handled, since the second substrate SUB22 has a relatively large size, a second structure SS220 including the second substrate SUB22 may easily be handled In other example embodiments, a plurality of structures such as the structure illustrated in FIG. 1 or 4 may be arranged between two substrates. An example of this is illustrated in FIG. 14.

Figure 14:
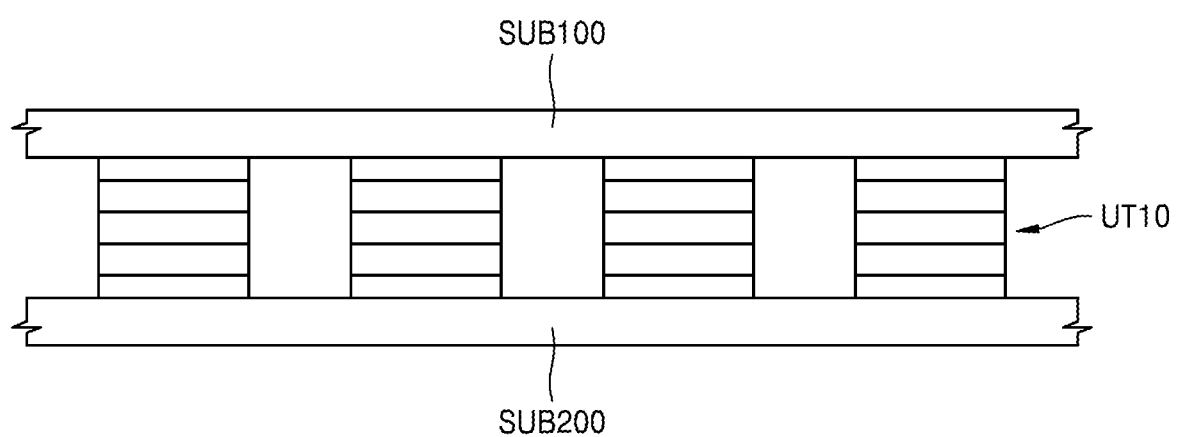
FIG. 14 is a cross-sectional view illustrating an energy harvester according to another example embodiment.

FIG. 14 is a cross-sectional view illustrating an energy harvester according to another example embodiment.

Referring to FIG. 14, a first substrate SUB100 and a second substrate SUB200 may be oriented to face each other, and a plurality of energy harvester units UT10 may be arranged between the first and second substrates SUB100 and SUB200. In FIG. 14, the structure of the energy harvester units UT10 is simply shown for ease of illustration. However, the structure of the energy harvester units UT10 may be identical or similar to the structure shown in FIG. 1 or 4. In addition, if necessary, a first common electrode may be provided on a side of the first substrate SUB100, and the energy harvester units UT10 may be commonly connected to the first common electrode. In addition, a second common electrode may be provided on a side of the second substrate SUB200, and the energy harvester units UT10 may be commonly connected to the second common electrode. If a plurality of energy harvester units UT10 are used as in the example embodiment, more amount of energy may be generated. In addition, even if one or some of the energy harvester units UT10 are damaged, the other energy harvester units UT10 may be used to generate electricity, and thus the energy harvester may be used more stably and reliably.

In other example embodiments, at least one spring element may be placed between a first structure having a first triboelectric material and a second structure having a second triboelectric material. The spring element may provide a restoring force, or resilient force, when the first and second structures are separated from each other after being brought into contact with each other. An example in which such a spring element is used is illustrated in FIG. 15.

Figure 15:
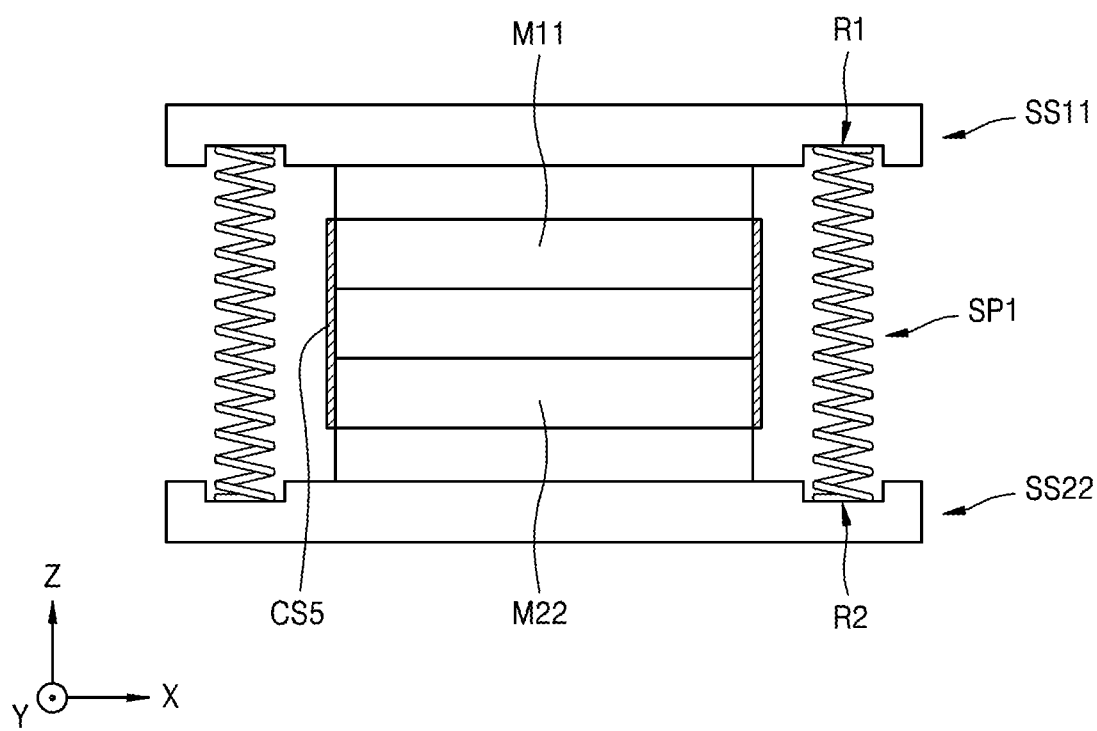
FIG. 15 is a cross-sectional view illustrating an energy harvester according to another example embodiment.

FIG. 15 is a cross-sectional view illustrating an energy harvester according to another example embodiment.

Referring to FIG. 15, a first structure SS11 may include a first material layer M11 having a first triboelectric material. A second structure SS22 may include a second material layer M22 having a second triboelectric material. The first and second material layers M11 and M22 may face each other. The first structure SS11 may include an active region in a certain region such as a center region thereof. In this case, the second structure SS22 may also include an active region in a center region thereof. The first and second material layers M11 and M22 may be located in the active regions. In other words, the first and second material layers M11 and M22 may respectively be in the active regions of the first and second structures SS11 and SS22. A closed structure CS5 may surround the first and second material layers M11 and M22.

In the example embodiment, at least one spring element SP1 may be provided around the active regions. For example, a plurality of spring elements SP1 may be provided around the active regions. For example, first accommodation portions R1 may be provided outside the active region of the first structure SS11. Similarly, second accommodation portions R2 may be provided outside the active region of the second structure SS22. The first and second accommodation portions R1 and R2 may be concave regions, that is, recessed regions. The plurality of spring elements SP1 may be inserted into the first and second accommodation portions R1 and R2. When the first and second structures SS11 and SS22 are separated from each other after being brought into contact with each other, the spring elements SP1 may provide returning force, that is, resilient force.

Figure 16:
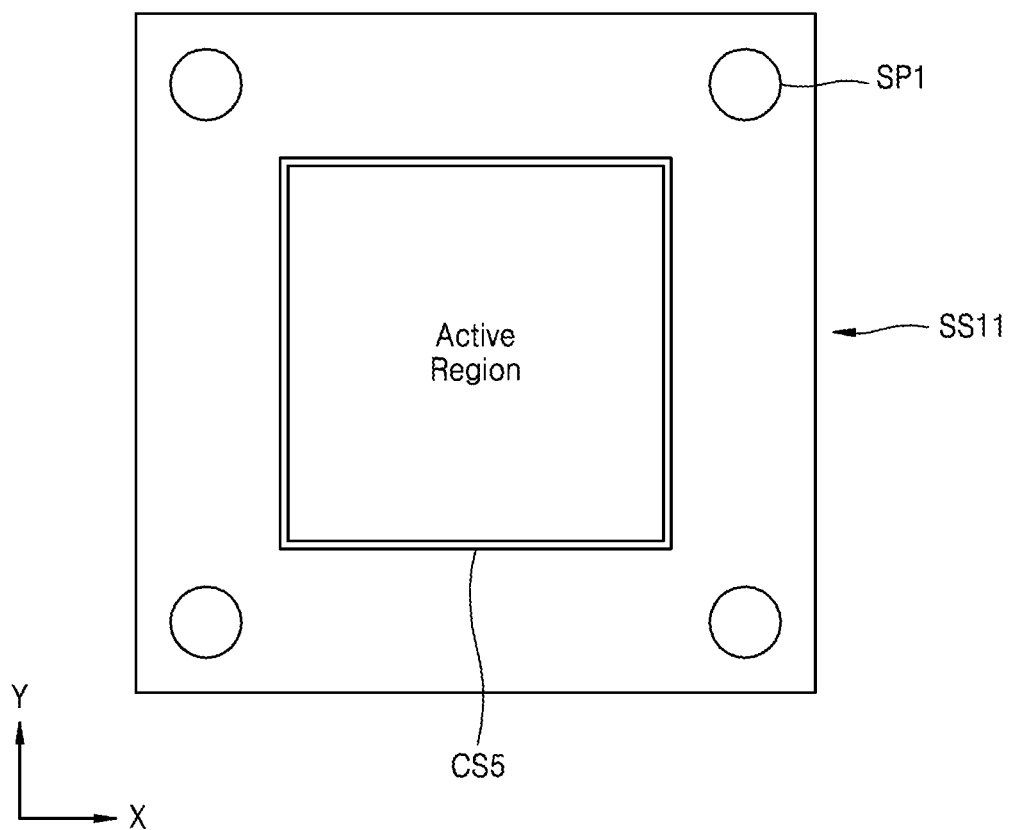
FIG. 16 is a plan view illustrating a structure of the energy harvester of FIG. 15 seen from the above.

FIG. 16 is a plan view illustrating a structure of the example energy harvester of FIG. 15 seen from the above. Referring to FIG. 16, the spring elements SP1 may be provided around the active regions. The number and positions of the spring elements SP1 are for illustrative purposes only. That is, the number and positions of the spring elements SP1 may be varied. The shape of the closed structure CS5 surrounding the active regions may also be varied.

Although the spring elements SP1 are used in the example embodiment shown in FIGS. 15 and 16, the use of the spring elements SP1 is optional. For example, other elements having a configuration that is similar to or the same as a configuration of the spring elements SP1 may be used instead of the spring elements SP1.

In the above-described example embodiments, friction sides or surfaces of the first material layers or of the first structures including the first triboelectric materials may be flat, and friction sides or surfaces of the second material layers or of the second structures including the second triboelectric materials may also be flat. However, this is an example. That is, the fiction surfaces may have other shapes instead of a flat shape. Examples thereof are illustrated in FIGS. 17 and 18.

Figure 17:
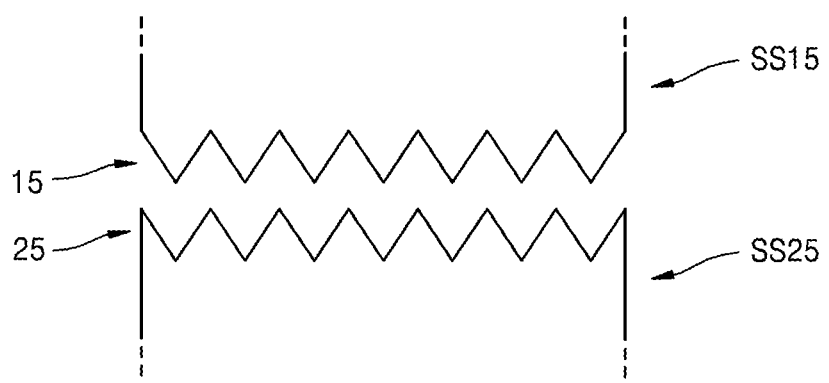
FIG. 17 is a cross-sectional view illustrating an energy harvester according to another example embodiment.

Referring to FIG. 17, mutually-facing, or first and second, friction surfaces 15 and 25 of first and second structures SS15 and SS25 including first and second triboelectric materials may have a concave-convex structure, or a correspondingly uneven structure. For example, it may be understood that the first friction surface 15 has a plurality of triangular protrusions, and the second friction surface 25 has a plurality of triangular concave portions. It is understood that the first friction surface 15 may have a plurality of triangular concave portions, and the second friction surface 25 has a plurality of triangular protrusions.

Figure 18:
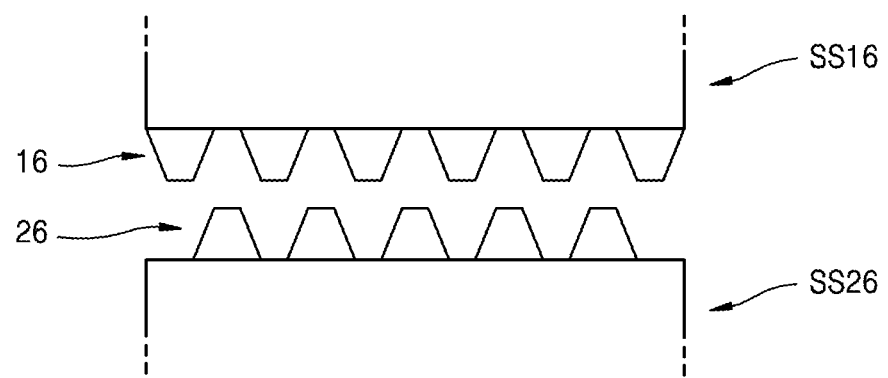
FIG. 18 is a cross-sectional view illustrating an energy harvester according to another example embodiment.

Referring to FIG. 18, first and second friction surfaces 16 and 26 of first and second structures SS16 and SS26 may have another concave-convex structure, or a correspondingly uneven structure. For example, the first friction surface 16 may include a plurality of first protrusions having a trapezoidal shape, and the second friction surface 26 may include a plurality of second protrusions having a trapezoidal shape and insertable between the first protrusions.

As illustrated in FIGS. 17 and 18, the uneven concave-convex friction surface structures increase friction areas, and thus the efficiency of electrification may be increased. Although not illustrated in FIGS. 17 and 18, closed structures may be provided, and filling materials may be filled in the closed structures. The closed structures and the filling materials may be identical or similar to the closed structure CS10 and the filling material F10 illustrated in FIG. 1. The uneven friction surface structures are not limited to those illustrated in FIGS. 17 and 18 but may be variously modified.

Figure 19:
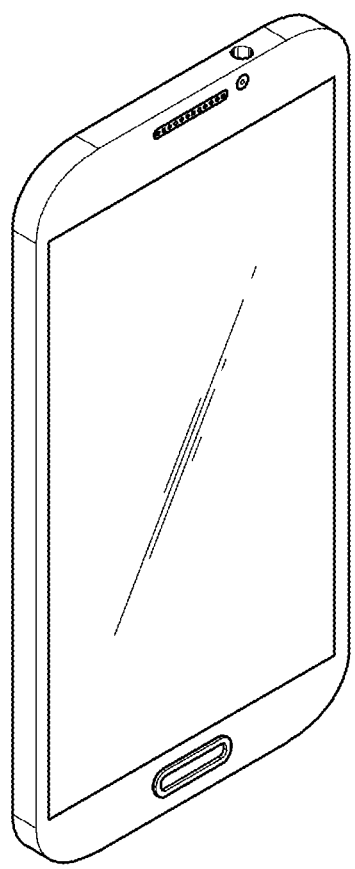
FIG. 19 is a perspective view illustrating an apparatus (electronic apparatus) to which an energy harvester is applicable according to an example embodiment.
Figure 20:
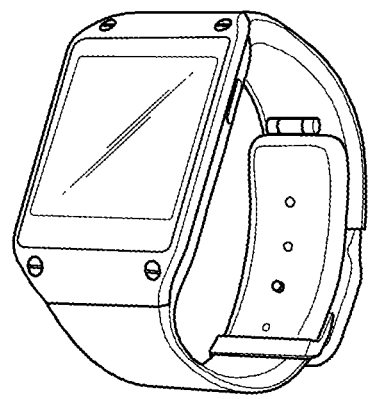
FIG. 20 is a perspective view illustrating an apparatus (electronic apparatus) to which an energy harvester is applicable according to another example embodiment.

The above-described energy harvesters of the example embodiments may be applied to various apparatuses such as electronic devices. In this case, such apparatuses (electronic apparatuses) may include circuit portions connected to the energy harvesters. The circuit portions may store or use electric energy generated by the energy harvesters. The circuit portions may have structures known in the field of electronic apparatuses. Thus, detailed descriptions of the circuit portions will not be discussed here. For example, the energy harvesters may be applied to apparatuses such as mobile devices or wearable devices. For example, the mobile devices may be cellular phones (smart phones) such as the smart phone illustrated in FIG. 19. For example, the wearable devices may be smart watches or smart bands such as the smart watch illustrated in FIG. 20. However, the application of the energy harvesters is not limited to mobile devices or wearable devices. That is, the energy harvesters may be applied to various apparatuses. For example, the energy harvesters of the example embodiments may be applied to apparatuses such as drones or sensors. Since the energy harvesters of the embodiments have high efficiency and structures for reducing or preventing deterioration of properties caused by external environment (environmental agents), the electric properties of electronic apparatuses including the energy harvesters may be improved.

It should be understood that the example embodiments described herein should be considered in a descriptive sense only and not for purposes of limitation. For example, it will be understood by those of ordinary skill in the art that the energy harvesters described with reference to FIGS. 1 to 7 and FIGS. 9 to 18 may be variously modified. In addition, those of ordinary skill in the art may understand that the energy harvesters may be applied to various fields. Thus, the scope and spirit of the inventive concepts are defined not by the descriptions of the example embodiments but by the appended claims.

What is claimed is:

1. An energy harvester comprising:
a first structure including a first triboelectric material;
a second structure including a second triboelectric material configured to generate electricity by friction with the first triboelectric material;
a closed structure configured to isolate friction surfaces of the first and second triboelectric materials from environmental agents; and
a filling material in the closed structure in contact with the first and second triboelectric materials and having a plurality of electric charges, the filling material being configured to increase an electrification efficiency of the first and second triboelectric materials,
wherein the first structure comprises a first material layer and a first electrode contacting the first material layer, the first material layer including the first triboelectric material, and the second structure includes a second material layer including the second triboelectric material, the second material layer being configured to be an electrode, and
wherein the closed structure surrounds a lateral side of the first material layer and a lateral side of the second material layer, and at least a portion of the first electrode is not covered with the closed structure.

2. The energy harvester of claim 1, wherein the first and second structures face each other, and
the first and second triboelectric materials are configured to be repeatedly brought into contact with, and separated from, each other.

3. The energy harvester of claim 1, wherein the filling material and the first electrode are physically separate from each other.

4. The energy harvester of claim 1, wherein
the second structure further includes a second electrode contacting the second material layer, the second material layer.

5. The energy harvester of claim 4, wherein the filling material is physically separate from the first and second electrodes.

6. The energy harvester of claim 4, wherein
at least a portion of the first electrode and at least a portion of the second electrode are not covered with the closed structure.

7. The energy harvester of claim 1, wherein at least a portion of the closed structure comprises an elastic material.

8. The energy harvester of claim 1, wherein the filling material comprises an ionic liquid or an ion-gel.

9. The energy harvester of claim 1, wherein the filling material has a positive electric charge and a negative electric charge.

10. The energy harvester of claim 1, wherein the filling material comprises a fluid having a viscosity of about 4 mPa·s or greater at a temperature of about 25° C.

11. The energy harvester of claim 1, wherein one of the first and second structures comprises at least one guide pin,
the other of the first and second structures includes at least one guide hole to receive the guide pin, and
the guide pin and the guide hole are configured to control a movement direction in which the second structure moves relative to the first structure.

12. The energy harvester of claim 1, further comprising at least one spring element between the first and second structures.

13. An electronic apparatus comprising:
the energy harvester of claim 1; and
a circuit portion connected to the energy harvester.

14. The electronic apparatus of claim 13, wherein the electronic apparatus is a mobile device or a wearable device.

15. An energy harvester comprising:
a first structure including a first triboelectric material;
a second structure including a second triboelectric material generating electricity by friction with the first triboelectric material; and
an intermediate material between the first and second structures and having an electric charge,
wherein the intermediate material is configured to move outward from a gap between the first and second structures when the gap between the first and second structures is decreased, and the intermediate material is configured to fill the gap between the first and second structures when the gap between the first and second structures is increased.

16. The energy harvester of claim 15, wherein the intermediate material comprises an ionic liquid or an ion-gel.

17. The energy harvester of claim 15, wherein the intermediate material has a positive electric charge and a negative electric charge.

18. The energy harvester of claim 15, wherein the intermediate material comprises a fluid having a viscosity of about 4 mPa·s or greater at a temperature of about 25° C.

19. The energy harvester of claim 15, further comprising a closed structure surrounding at least a portion of the energy harvester,
wherein the intermediate material is in the closed structure, and
at least a portion of the closed structure includes an elastic material.

20. The energy harvester of claim 15, wherein the first structure comprises a first material layer and a first electrode contacting the first material layer, the first material layer including the first triboelectric material, and
the second structure includes a second material layer including the second triboelectric material and configured to be an electrode.

21. The energy harvester of claim 15, wherein the first structure comprises a first material layer and a first electrode contacting the first material layer, the first material layer including the first triboelectric material, and the second structure includes a second material layer and a second electrode contacting the second material layer, the second material layer including the second triboelectric material.

22. An electronic apparatus comprising:

the energy harvester of claim 15; and a circuit portion connected to the energy harvester.

23. The electronic apparatus of claim 22, wherein the electronic apparatus is a mobile device or a wearable device.

* * * * *